(12) United States Patent
Timchuk

(10) Patent No.: US 8,281,987 B2
(45) Date of Patent: Oct. 9, 2012

(54) TIM SYSTEM

(76) Inventor: Denis Timchuk, Foothill Ranch, CA (US)

(*) Notice: Subject to any disclaimer, the term of this patent is extended or adjusted under 35 U.S.C. 154(b) by 100 days.

(21) Appl. No.: 12/508,471

(22) Filed: Jul. 23, 2009

(65) Prior Publication Data

US 2011/0017819 A1   Jan. 27, 2011

(51) Int. Cl.
*G06Q 40/00* (2006.01)
*G07D 11/00* (2006.01)
*G07F 19/00* (2006.01)

(52) U.S. Cl. ........................................ 235/379; 235/375

(58) Field of Classification Search .................. 235/379, 235/380, 375, 487, 381; 705/39, 43
See application file for complete search history.

(56) References Cited

U.S. PATENT DOCUMENTS

| 5,937,396 | A * | 8/1999 | Konya | 705/43 |
| 7,516,882 | B2 * | 4/2009 | Cucinotta | 235/379 |
| 7,644,037 | B1 * | 1/2010 | Ostrovsky | 705/40 |
| 2008/0091591 | A1 * | 4/2008 | Egnatios et al. | 705/38 |
| 2009/0144198 | A1 * | 6/2009 | Hachey | 705/44 |

* cited by examiner

*Primary Examiner* — Edwyn Labaze

(57) ABSTRACT

TIM System is the system that will allow people around the world to wire money more efficiently and more sufficiently. There is no more waiting in line and/or for the hours of operation of Money Transfer Companies such as Western Union, Money Gram and etc. TIM System is capable to wire money in matter of minutes on any day at any time including the major holidays just by using ATMs. TIM System is the unique program that is setup in financial institutions and allows its ATMs to operate the money wire transactions worldwide. TIM System program is an extra feature that works along with or communicates to ATMs and gives people an opportunity to send (wire) and/or receive (withdraw) money through it when it is most needed. Simply by using a major credit or debit card via TIM System anyone can request a money wire transaction at any ATM and its financial institutions.

3 Claims, 2 Drawing Sheets

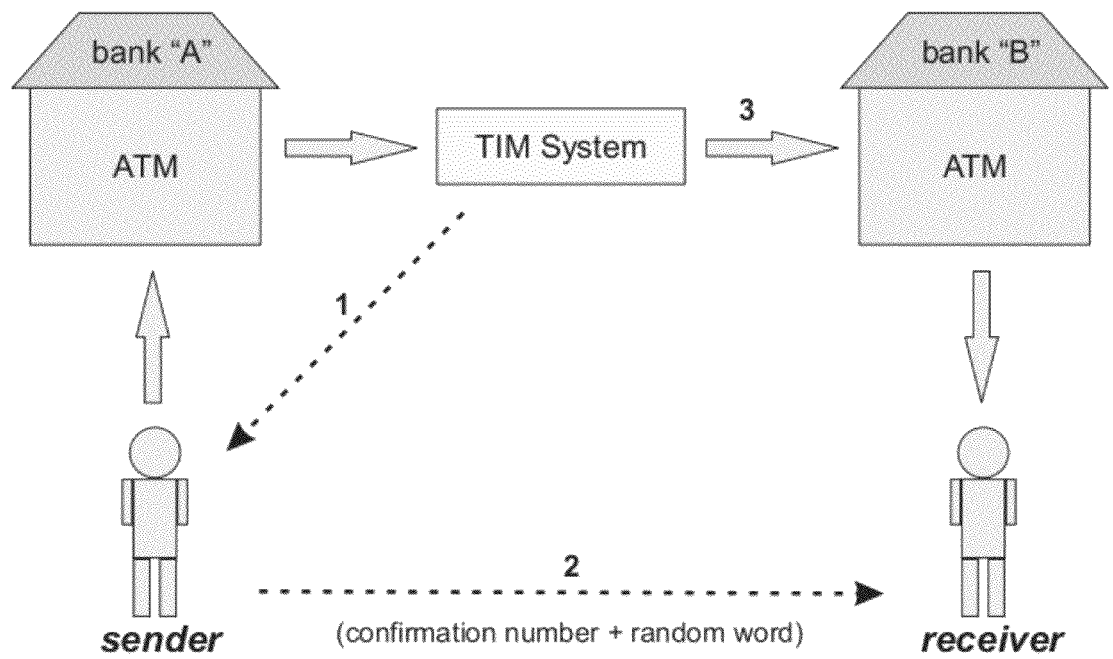

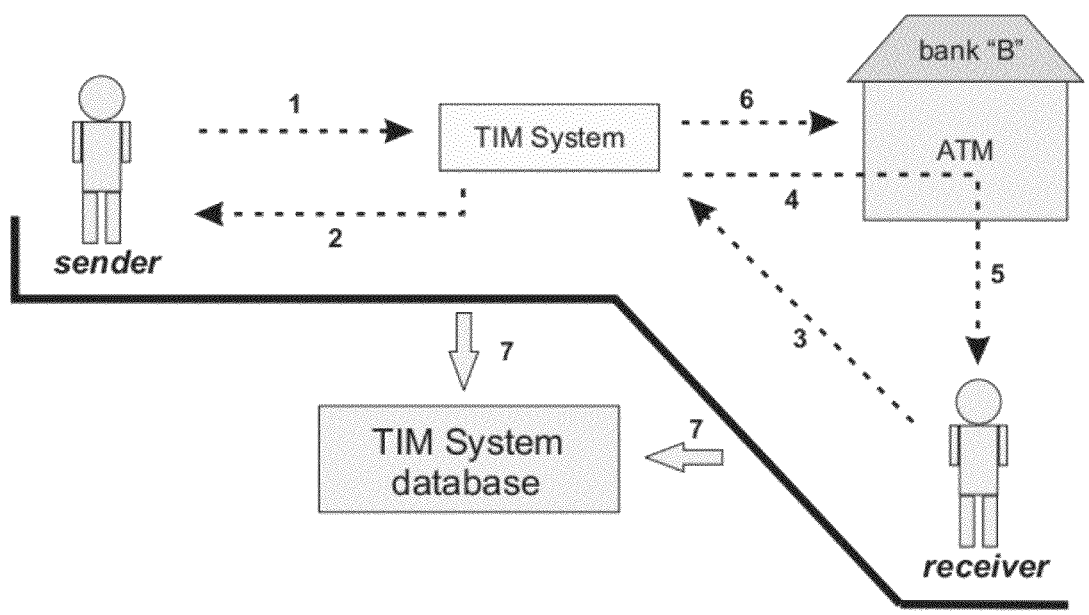
Figure 2 - TIM System by Denis Timchuk

TIM SYSTEM

INTRODUCTION

TIM System will allow people around the world to wire money more efficiently and more sufficiently. There is no more waiting in line and/or for the hours of operation of Money Transfer Companies such as Western Union, Money Gram and etc. TIM System is capable to wire money in matter of minutes on any day at any time including the major holidays. TIM System is the unique program that is setup in financial institutions and allows its ATMs to operate the money wire transactions worldwide. TIM System program is an extra feature that works along with or communicates to ATM and gives people an opportunity to send (wire) and/or receive (withdraw) money through it when it is most needed.

What Tim System Exactly is?

First of all, TIM System is a unique innovative idea. Second of all, it is a computer software program that allows ATMs (Automated Transaction Machines) around the world to operate money wire transactions on the spot in matter of minutes if not seconds.

How does Tim System Work?

TIM System is the simplest and most convenient method of wiring money to your family, friends, business partners, and to those who need them the most when emergency occurs. To better illustrate the steps of money wiring operations please see FIG. 1.

Using ATM:
01. Both 'sender' (who wires the money) and 'receiver' (whom the money is wired to) should have debit or credit card of any bank with the MasterCard or VISA logo or whichever bank accepts.
02. 'Sender' needs to go to any ATM that has TIM System logo. It means that this particular bank has an agreement with the TIM System that allows its ATMs to operate money wire transactions on the spot.
03. 'Sender' inputs his/her card into ATM and follows its regular procedure, those are "Enter your PIN number" and etc. After sender's card is accepted he/she should look for the "TIM System" feature which is located on the screen along with other selections such as "Balance inquire", "Withdraw", "Deposit" and etc.
04. After 'sender' selects "TIM System" he/she will be asked to choose either to SEND or RECEIVE the money.
05. If you are 'sender' you should select SEND. Then you will be asked to enter the amount you would like to wire. Simply use the ATM's keypad to enter the amount.
06. After confirming the correct amount 'sender' will be given an option to choose either:
    a. Add the fee transaction to the wiring amount (ex.: S100.00 wiring amount+$5.00 fee=$105.00 total charge for 'sender' and $100.00 wired to 'receiver')
    b. Include the fee transaction into wiring amount (ex.: $100.00 wiring amount+$5.00 fee=$100.00 total charge for 'sender' and $95.00 wired to 'receiver')
07. After selection is authorized, 'sender' will receive a confirmation number on a screen. It is VERY important to write this number down. Sender can choose to print this confirmation number as well. The confirmation number will be valid for a certain time period only. If during this time money is not withdrawn by 'receiver' the wire transaction will be voided.
08. For the security purposes the random words will appear on a screen where 'sender' will select one and 'receiver' will have to match the same word upon withdrawing the cash.
09. Then 'sender' should provide 'receiver' with the confirmation number and the random word.
10. 'Receiver' goes to any ATM that has TIM System logo and inputs his/her major debit or credit card and follows its regular procedure. Then 'receiver' should select TIM System option.
11. 'Receiver' as 'sender' will be given the same option either to SEND or RECEIVE the money. Since you are 'receiver' select RECEIVE. Then you will be asked to enter the confirmation number.
12. If the entered confirmation number is correct, the random words will appear on a screen and 'receiver' will have to match with one that was selected by 'sender'. After verifying the correct word, available amount to be withdrawn will appear on a screen. Then simply select either to withdraw or cancel the transaction. Please note: if 'receiver' is located in different country the amount to be withdrawn will appear in its local currency.

Using a Bank:
01. 'Sender' can wire and 'receiver' can collect the money at a local bank that has an agreement with TIM System.
02. If you are 'sender', simply present your major credit or debit card to a bank teller and request money wire transaction via TIM System.
03. 'Sender' tells to a bank teller the amount he/she wishes to wire. Then a bank teller will provide 'sender' with a confirmation number and a random word that has to be passed to 'receiver'.
    a. 'Sender' can choose to give cash to a bank teller in the amount he/she is going to wire instead of putting it on a credit or debit card. However, 'sender' is still obligated to give his/hers credit or debit card to a bank teller for the fees transaction charges purposes.
    b. In case if 'sender' does not possess a major credit or debit card, he/she still can wire the money by using cash and presenting a personal identification such as a passport or a driver's license. Although, in this case a bank may charge an additional service fee.
04. 'Receiver' provides a bank teller with the confirmation number and the random word to collect the wired money. If 'receiver' is in different country from 'sender' he/she can choose to withdraw the money either in its original currency (if available) or in its local currency.
05. In this case when 'receiver' withdraws money from a bank he/she does not have to present a major credit or debit card. Although 'receiver' is obligated to present some kind of personal identification which can be a passport or a driver's license.
06. 'Sender' can wire the money from a local bank and 'receiver' can still withdraw it from any ATM that has TIM System logo. The wire transaction can be done vise versa as well.
07. It is very important to remember that money wiring should be done during the hours of operations of that bank and TIM System timeframe.

Using Internet:
01. TIM System also offers on-line money wire services. On-line service is another convenient way to wire money to your close ones and track all your transactions. On-line feature is mostly designed for the convenience of sender.
02. In order to use on-line service, 'sender' needs to register on TIM System's website and create an account.

03. After registering with TIM System's website sender can request money wire transactions on-line.
04. Simply input amount to be wired.
05. After confirming the correct amount 'sender' will be given an option to choose either:
   a. Add the fee transaction to the wiring amount (ex.: $100.00 wiring amount+$5.00 fee=$105.00 total charge for 'sender' and $100.00 wired to 'receiver')
   b. Include the fee transaction into wiring amount (ex.: $100.00 wiring amount+$5.00 fee=$100.00 total charge for 'sender' and $95.00 wired to 'receiver')
06. After selection is authorized, 'sender' will receive a confirmation number on a screen. It is VERY important to write this number down. 'Sender' can choose to print this confirmation number as well. The confirmation number will be valid for a certain time period only. If during this time money is not withdrawn by 'receiver' the wire transaction will be voided.
07. For the security purposes the random words will appear on a screen where 'sender' will select one and 'receiver' will have to match the same word upon withdrawing the cash.
08. Then 'sender' should provide receiver with the confirmation number and the random word.
09. 'Receiver' can withdraw the wired money either from a bank or ATM, as long as they both support TIM System.
10. 'Sender' can always access his/hers on-line account and track all the transactions.

Amount and Time Limitations

TIM System has timeframe and amount to be wired/withdrawn limitations.

Timeframe limitations
01. TIM System allows only a certain period of time when 'sender' and 'receiver' can complete a full cycle of money wiring transaction. A full cycle of money wiring transaction is when 'sender' starts the transaction by wiring the money and 'receiver' completes it by withdrawing the wired amount.
02. TIM System allows 24 hours for 'receiver' to withdraw the wired amount from the time when 'sender' requests money wiring service. If during this time a full cycle of money wiring transaction is not completed, the transaction will be voided.
03. If during 24-hour time period 'receiver' withdraws only a portion of wired amount, due to ATM's withdrawal limitations or any other reasons, then TIM System will extend its timeframe for up to 7 days from the time when first withdrawal was made. If during 7-day time period the remaining balance is not withdrawn the confirmation number will be voided.

Amount Limitations
01. There is an amount limit for wiring as well, but it will be announced at a later time.

Fees and Charges
01. TIM System charges the transaction fee which is calculated based on the amount to be wired.
02. TIM System only charges 'sender' and not 'receiver'
03. When 'sender' uses TIM System to wire the money, his/her major credit or debit card will be charged with the amount to be wired plus a transaction fee.
04. Using debit or credit card by 'sender'
   a. If a debit card is used, there has to be sufficient funds to be wired.
   b. If a credit card is used, there has to be a sufficient purchase limit line for money to be wired.
05. When 'receiver' withdraws the money from ATM, the bank may charge an additional withdrawal fee from the wired amount. Although using TIM System will not exceed banking standard withdrawal fee rate.
06. If 'receiver' is in different country from sender and uses ATM to withdraw the wired money, he/she may lose some percentage of the total wired amount due to currency exchange rate.
   a. 'Receiver' can choose to withdraw the wired money from a physical banking branch that has an agreement with TIM System. In this case 'receiver' can request from a bank teller to collect the wired amount in its originated currency (if available) avoiding currency exchange charges. Although banking standard withdrawal fee still may apply.
   b. Please note: if you choose to withdraw the wired money from the actual bank, you need to make sure that the transaction is being made within the hours of operation of that bank and within TIM System timeframe otherwise the money wire transaction will be voided.
07. TIM System on-line service charges a bit extra for the transaction fee because of its expediency.
08. If the transaction is voided 'sender' will be reimbursed partially. TIM System will withhold the transaction fee plus voidance penalty fee; the rest amount will be credited back to his/her card.
   a. If 'sender' used cash for the money transfer at the bank, he/she can return to the bank and present his/hers confirmation number along with the personal identification that was presented upon the wiring request. Please note: TIM System will still withhold the transaction fee plus voidance penalty fee; the remaining balance will be reimbursed by a bank teller.
09. After transaction has been voided 'sender' will have 30 days to get back a refund. If during this time the refund is not collected, the wired amount balance will be acquired by TIM System.

How does Tim System Program Operate?

TIM System is a software program that is installed into banking system that allows its ATMs to operate money wire transactions. To better illustrate TIM System operation please see FIG. 2.
01. TIM System gives an option either to withdraw or to wire money in ATMs, banks and on-line (wire only).
02. TIM System charges sender's credit or debit with the amount he/she selects to wire plus a transaction fee.
03. TIM System generates the confirmation number that is valid for a certain period of time.
04. TIM System generates the random words that has to be matched by 'receiver'.
05. Every single transaction is protected and stored in Tim System database.
06. TIM System option allows withdrawing money from any ATM whose banks have an agreement with.
07. TIM System reimburses a bank where money was withdrawn within the period that is stated on the agreement between TIM System and that bank.

DRAWINGS DESCRIPTION

FIG. 1
This drawing illustrates the steps of how the money wire transaction operates. Sender goes to a bank or an ATM and inputs his/her major credit or debit card and selects the amount to be wired. Then receiver goes to a bank or an ATM and withdraws from it the wired amount.

Arrow #1—TIM System charges sender's credit or debit card with the selected amount to be wired, plus the transaction fees.

Arrow #2—Sender should provide receiver with the confirmation number and the random word.

Arrow #3—TIM System reimburses the financial institution with the amount that was withdrawn by receiver.

FIG. 2

This drawing illustrates the steps of TIM System operation.

Arrow #1—TIM System charges sender's credit or debit card with the selected amount to be wired, plus transaction.

Arrow #2—TIM System generates the confirmation number for sender and confirms the random word which is selected by sender.

Arrow #3—Receiver enters the confirmation number and the matching random word. TIM System verifies it.

Arrow #4—After verifying the confirmation number and the random word, TIM System gives an authorization to the financial institution (ATM) for withdrawal.

Arrow #5—Financial institution issues money to receiver.

Arrow #6—TIM System reimburses the financial institution with the amount that was withdrawn by receiver.

Arrow #7—All transaction data is stored in the TIM System Database.

The invention claimed is:

1. ATM to ATM money wire transactions comprising of: a system software program that is integrated with financial institutions and has a licensed agreement; said system program allows ATM (aka: Automated Transaction Machines, automated teller machine, automated banking machine, money machine, bank machine, cash machine, hole-in-the-wall, cashpoint, bancomat, any time money and etc) to initiate and operate money wire transactions worldwide on the spot; neither the sender nor the receiver has to have a registered account with the TIM System to initiate the money wire transactions; all is needed is a major debit card or a credit card of any financial institutions with the VISA, MasterCard or AMEX logo on it or whichever bank accepts;

using the system, the sender is capable to send the money at any ATM by using a major credit or debit card and the receiver is capable to withdraw the money from any ATM worldwide by using a major credit or debit card, as long as that ATM has the TIM System logo on it, which means this particular financial institution and/or bank has a licensed agreement with the TIM System that allows its ATMs to initiate and operate money wire transactions on the spot;

the sender inputs his/her debit or credit card into the ATM and follows its regular procedure by entering the PIN number and etc; after the sender's card is accepted, he/she selects the "TIM System" feature which is listed on the screen along with other options (such as "Balance inquire ", "Withdraw"), and chooses either to SEND or RECEIVE the funds; if SEND is selected, then the sender will be asked to key in the amount to be sent and then will receive a confirmation number upon the transaction completion; the sender provides the receiver with the confirmation number;

the sender's credit or debit card will be debited with the requested amount for the wire transfer plus with any additional transaction fees;

the receiver inputs his/her debit or credit card into the ATM and follows its regular procedure by entering the PIN number and etc; after the receiver's card is accepted he/she selects the "TIM System" feature which is listed on the screen along with other options (such as "Balance inquire ", "Withdraw"), and chooses to RECEIVE the funds and keys in the confirmation number provided by the sender to authorize the withdrawal of the transferred funds;

TIM System program gives an authorization to financial institutions and/or ATM either to accept or decline the money transfer request; if the program accepted the money transfer request, then TIM System gives an authorization to financial institutions and/or ATM to withdraw the wired amount.

2. ATM to Financial Institutions (Bank) money wire transactions and from Financial Institutions (Bank) to ATM money wire transactions comprising of: the money wire transactions that can be initiated at any ATM and/or financial institutions that the TIM System has a licensed agreement with; TIM System also allows initiating the money wire transaction at any ATM and to withdraw the wired funds at any financial institutions and/or banks, or vise versa to initiate the money wire transaction at any financial institutions and/or banks and to withdraw the wired funds from any ATM; neither the sender nor the receiver has to have a registered account with the TIM System to initiate the money wire transactions; all is needed is a major debit card or a credit card of any financial institutions with the VISA, MasterCard or AMEX logo on it or whichever bank accepts;

via TIM System program, the sender is capable to send the money at any ATM by using a major debit or credit card and the receiver is capable to withdraw the money from any financial institutions;

the sender inputs his/her debit or credit card into the ATM and follows its regular procedure by entering the PIN number and etc; after the sender's card is accepted he/she selects the "TIM System" feature which is listed on the screen along with other options (such as "Balance inquire ", "Withdraw"), and chooses either to SEND or RECEIVE the funds; if SEND is selected, then the sender will be asked to key in the amount to be sent and then will receive a confirmation number upon the transaction completion; the sender provides the receiver with the confirmation number;

the sender's credit or debit card will be debited with the requested amount for the wire transfer plus with any additional transaction fees;

the receiver goes to a financial institution and/or bank and provides a bank teller with the confirmation number to collect the wired money; when the receiver request to withdraw the wired money via TIM System from a financial institution and/or bank the receiver does not have to present a major credit or debit card but rather is obligated to present some kind of personal identification which can be a passport or a driver's license;

via TIM System program, the sender is capable to initiate the money wire transaction at any financial institutions and/or banks by using a major debit or credit card or cash and the receiver is capable to withdraw the wired money from any ATM worldwide by using a major debit or credit card;

the sender provides a bank teller with a major credit or debit card and requests the amount to be sent via TIM System; the sender's credit or debit card will be debited with the requested amount for the wire transfer plus with any additional transaction fees; in case the sender does not possess a major credit or debit card, he/she can still send the money by using cash and presenting a personal identification document such as a passport or a driver's license;

then a bank teller provides the sender with a confirmation number that has to be passed on to the receiver;

the receiver inputs his/her debit or credit card into the ATM and follows its regular procedure by entering the PIN number and etc; after the receiver's card is accepted he/she selects the "TIM System" feature which is listed on the screen along with other options (such as "Balance inquire ", "Withdraw"), and chooses to RECEIVE the funds and keys in the confirmation number provided by the sender to authorize the withdrawal of the transferred funds;

TIM System program gives an authorization to financial institutions and/or ATM either to accept or decline the money transfer request; if the program accepted the money transfer request then TIM System gives an authorization to financial institutions and/or ATM to withdraw the wired amount.

3. Online to ATM money wire transactions comprising of the following: the sender has an option to initiate the money wire transaction online on the TIM System's website, and the funds can be easily withdrawn by the receiver at any ATM that the TIM System has an agreement with; neither the sender nor the receiver has to have a registered account with the TIM System to initiate the money wire transactions; however it will benefit to create one to track all past transactions that the sender initiated; all is needed is a major debit card or a credit card of any financial institutions with the VISA, MasterCard or AMEX logo on it or whichever bank accepts;

via TIM System program, the sender is capable to send the money on-line or through Internet by using a major credit or debit card and the receiver is capable to withdraw the wired money from any ATM worldwide by using a major credit or debit card;

via TIM System program, the sender goes on the TIM System website and looks for the option to initiate the money wire transaction; then the sender fills out the requested form by entering his/her debit or credit card information, first/last name, email and etc; and keys in the amount to be sent;

after completing the form, the sender clicks on the authorize button to initiate the money wire transaction and will receive a confirmation number on the screen and via email; the sender provides the receiver with the confirmation number;

the sender's credit or debit card will be debited with the requested amount for the wire transfer plus with any additional transaction fees;

the receiver inputs his/her debit or credit card into the ATM and follows its regular procedure by entering the PIN number and etc; after the receiver's card is accepted he/she selects the "TIM System" feature which is listed on the screen along with other options (such as "Balance inquire ", "Withdraw"), and chooses to RECEIVE the funds and keys in the confirmation number provided by the sender to authorize the withdrawal of the transferred funds;

TIM System program gives an authorization to financial institutions and/or ATM either to accept or decline the money transfer request; if the program accepted the money transfer request then TIM System gives an authorization to financial institutions and/or ATM to withdraw the wired amount.

\* \* \* \* \*